(12) United States Patent
Bauer et al.

(10) Patent No.: US 9,958,200 B2
(45) Date of Patent: May 1, 2018

(54) METHOD FOR SEPARATING OFF ACID GASES FROM NATURAL GAS

(71) Applicant: LINDE AKTIENGESELLSCHAFT, Munich (DE)

(72) Inventors: Heinz Bauer, Ebenhausen (DE); Claudia Gollwitzer, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 810 days.

(21) Appl. No.: 14/326,665

(22) Filed: Jul. 9, 2014

(65) Prior Publication Data
US 2015/0013380 A1    Jan. 15, 2015

(30) Foreign Application Priority Data
Jul. 11, 2013   (DE) .................. 10 2013 011 640

(51) Int. Cl.
*F25J 3/00*    (2006.01)
*F25J 3/02*    (2006.01)
(Continued)

(52) U.S. Cl.
CPC ............. *F25J 3/0266* (2013.01); *C10L 3/102* (2013.01); *F25J 3/0209* (2013.01); *F25J 3/0233* (2013.01); *F25J 3/067* (2013.01); *F25J 3/0635* (2013.01); *C10L 2290/543* (2013.01); *C10L 2290/545* (2013.01); *C10L 2290/548* (2013.01);
(Continued)

(58) Field of Classification Search
CPC ........ F25J 3/0233; F25J 3/0266; F25J 3/0635; F25J 3/067; F25J 2200/66; F25J 2200/82; F25J 1/0095; F25J 3/0209; F25J 3/061; F25J 1/0022; F25J 1/0027; F25J 1/005; F25J 1/0052; F25J 1/0242; F25J 5/005; F25J 2200/02; F25J 2210/60; F25J 2215/60; F25J 2215/80; F25J 2220/66; F25J 2270/08; F25J 2270/14; F25J 2270/16; C10L 3/102
See application file for complete search history.

(56) References Cited

U.S. PATENT DOCUMENTS 4,152,129 A * 5/1979 Trentham ................ C07C 7/005
                                                    62/623
5,983,663 A * 11/1999 Sterner ................ B01D 53/002
                                                    62/620
(Continued)

*Primary Examiner* — Keith Raymond
(74) *Attorney, Agent, or Firm* — Millen White Zelano & Branigan, PC

(57) ABSTRACT

A method is provided for separating off acid gases, in particular $CO_2$ and $H_2S$, from a hydrocarbon-rich fraction, in particular natural gas. The hydrocarbon-rich fraction is cooled and partially condensed. The resultant $CO_2$-enriched liquid fraction is separated by rectification into a $CO_2$-rich liquid fraction and a $CO_2$-depleted gas fraction. The hydrocarbon-rich fraction is cooled close to the temperature of the $CO_2$ triple point by means of a closed multistage refrigeration circuit. The refrigerant is a $CO_2$ fraction of greater than 99.5% by volume. The rectification column is operated at a pressure between 40 and 65 bar. The reboiler of the rectification column is heated by means of a condensing refrigerant substream of the refrigeration circuit that is at a suitable pressure level.

20 Claims, 2 Drawing Sheets

(51) Int. Cl.
   *F25J 3/06*      (2006.01)
   *C10L 3/10*      (2006.01)
(52) U.S. Cl.
   CPC ........ *F25J 2200/02* (2013.01); *F25J 2200/40* (2013.01); *F25J 2200/70* (2013.01); *F25J 2200/76* (2013.01); *F25J 2205/04* (2013.01); *F25J 2205/40* (2013.01); *F25J 2205/50* (2013.01); *F25J 2205/80* (2013.01); *F25J 2210/06* (2013.01); *F25J 2210/60* (2013.01); *F25J 2220/66* (2013.01); *F25J 2235/80* (2013.01); *F25J 2240/40* (2013.01); *F25J 2260/80* (2013.01); *F25J 2270/12* (2013.01); *F25J 2270/14* (2013.01); *F25J 2270/16* (2013.01); *F25J 2270/80* (2013.01); *F25J 2270/902* (2013.01); *Y02C 10/12* (2013.01)

(56) References Cited

U.S. PATENT DOCUMENTS

| | | | |
|---|---|---|---|
| 7,386,996 B2 * | 6/2008 | Fredheim | F25J 1/0022 |
| | | | 62/612 |
| 7,806,965 B2 | 10/2010 | Stinson | |
| 2008/0302650 A1 * | 12/2008 | Bello | F25J 3/0209 |
| | | | 203/25 |
| 2008/0312347 A1 * | 12/2008 | Ernst | C01B 3/36 |
| | | | 518/702 |
| 2013/0036765 A1 | 2/2013 | Renaud | |
| 2014/0123700 A1 * | 5/2014 | Stallmann | B01D 53/002 |
| | | | 62/617 |

* cited by examiner

METHOD FOR SEPARATING OFF ACID GASES FROM NATURAL GAS

The invention relates to a method for separating off acid gases, in particular $CO_2$ and $H_2S$, from a hydrocarbon-rich fraction, in particular natural gas, wherein the hydrocarbon-rich fraction is cooled and partially condensed, and the resultant $CO_2$-enriched liquid fraction is separated by rectification into a $CO_2$-rich liquid fraction and a $CO_2$-depleted gas fraction.

The removal of acid gases, in particular $CO_2$ and $H_2S$, from hydrocarbon-rich fractions, in particular from natural gas mixtures, usually proceeds by means of an amine scrubbing. For concentrations above about 10% by volume, alternative methods can be also used, such as membranes, for example, for preliminary separation, in particular of $CO_2$. In the case of still higher $CO_2$ concentrations—for instance, 20% by volume $CO_2$ or higher—cryogenic preliminary separation of $CO_2$ is also technically and economically expedient.

For cryogenic separation, the acid gas-containing, hydrocarbon-rich gas mixture is fractionated by partial condensation and subsequent rectification into a gas phase having 10 to 40% by volume $CO_2$, preferably 15 to 25% by volume $CO_2$, and a liquid phase having at least 90% by volume $CO_2$, preferably at least 95% by volume $CO_2$. The gas phase is usually fed to a further $CO_2$ removal.

U.S. Pat. No. 7,806,965 describes a method of the abovementioned type in which propane is used as refrigerant. As a result, the lowest temperature is restricted to about −40° C.

US patent application 2013/0036765 discloses a method in which an open $CO_2$ circuit is used to supply of refrigeration. As a result, a lower temperature can be reached than with the process of U.S. Pat. No. 7,806,965. Achievement of the lower temparatures permits a stronger partial condensation of $CO_2$ and consequently a lower $CO_2$ concentration in the gaseous product stream. However, for the rectification of the $CO_2$-rich liquid, only the sensible heat of the gas mixture is used. This means that the heat transformation in the reboiler of the rectification column is restricted to the $CO_2$-rich liquid. Therefore, the purity of the $CO_2$-rich bottom product of the rectification column withdrawn in the liquid state is also restricted.

The methods disclosed in the two abovementioned documents use complex multistream heat exchangers, for example plate heat exchanges, which, in the use of liquid $CO_2$, in particular on account of the risk of solids formation, are exposed to an increased mechanical loading.

An object of the present invention is to specify a method of the type in question for separating off acid gases, in particular $CO_2$ and $H_2S$, from a hydrocarbon-rich fraction, in particular natural gas, the separation sharpness of which—that is to say the selective separation of $CO_2$ from the gas mixture with high yield and purity—is increased in comparison with the methods belonging to the prior art, and the energy consumption of which is reduced.

Upon further study of the specification and appended claims, other objects, aspects and advantages of the invention will become apparent.

To achieve these objects there is provided a method for separating off acid gases from a hydrocarbon-rich fraction is proposed, which is characterized in that the hydrocarbon-rich fraction is cooled to close to the temperature of the $CO_2$ triple point (−56.6° C.) by means of a closed multistage refrigeration circuit, the refrigerant of which has a $CO_2$ fraction of greater than 99.5% by volume, the rectification column is operated at a pressure between 40 and 65 bar, and the reboiler of the rectification column is heated by means of a condensing refrigerant substream of the refrigeration circuit that is at a suitable pressure level.

According to the invention, the hydrocarbon-rich fraction is cooled by means of a closed multistage refrigeration circuit in which, as refrigerant, what is termed technically pure carbon dioxide is circulated; this has a $CO_2$ fraction of greater than 99.5% by volume. The hydrocarbon-rich friction can be cooled thereby to close to the temperature of the $CO_2$ triple point (−56.6° C.). In a development of the method according to the invention, it is proposed that the hydrocarbon-rich fraction is not cooled below a temperature of −55° C., preferably not below a temperature of −52° C. On the other hand, the hydrocarbon-rich fraction should be cooled to at least −45° C. In addition, according to the invention, the rectification or the rectification column is operated at a pressure between 40 and 65 bar, preferably between 50 and 60 bar. In addition, the reboiler of the rectification column is heated according to the invention by means of a condensing refrigerant substream of the abovementioned refrigeration circuit that is at a suitable pressure level.

The abovedescribed method according to the invention for separating off acid gases from a hydrocarbon-rich fraction is distinguished by a comparatively high separation sharpness, and also high energy efficiency compared with the known methods.

Further advantageous embodiments of the method according to the invention for separating off acid gases from a hydrocarbon-rich fraction are detailed in the dependent claims. Also, additional details and advantages of the invention are explained in the following description of the figures.

BRIEF DESCRIPTION OF THE DRAWINGS

The method according to the invention for separating off acid gases from a hydrocarbon-rich fraction will be described in more detail hereinafter with reference to with reference to the figures wherein:

As illustrated in FIGS. 1 and 2, the hydrocarbon-rich, acid gas-containing fraction 1 is first subjected to a drying procedure A, and then cooled to close to the temperature of the $CO_2$ triple point and partially condensed in four heat exchangers E1 to E4, which are preferably double-pipe heat exchangers. A suitable drying procedure A typically involves two or more parallel vessels, which are filled with molecular sieve adsorbent with at least one vessel in adsorption mode while the balance of vessels is subject to regeneration. Alternatively, glycol can be used in a scrubbing unit to extract moisture from the feed gas down to the required level. The partially condensed hydrocarbon-rich fraction 2 is then separated in the separator D1 into a $CO_2$-depleted gas fraction 3 and a $CO_2$-enriched liquid fraction 5. The gas fraction 3 is warmed in heat exchanger E6 against a substream 10 of the hydrocarbon-rich fraction and is then fed via conduit 4 to further use thereof. The $CO_2$-enriched liquid fraction 5 produced in the separator D1 is fed by means of the pump P1, and after expansion in the valve V8, to the top of the rectification column T1. The refrigerant substream 11 that is cooled in the heat exchanger E6 against the gas fraction 3 that is to be warmed is fed via the expansion valve V6 to the hydrocarbon-rich fraction between the heat exchangers E3 and E4.

Figure 1:
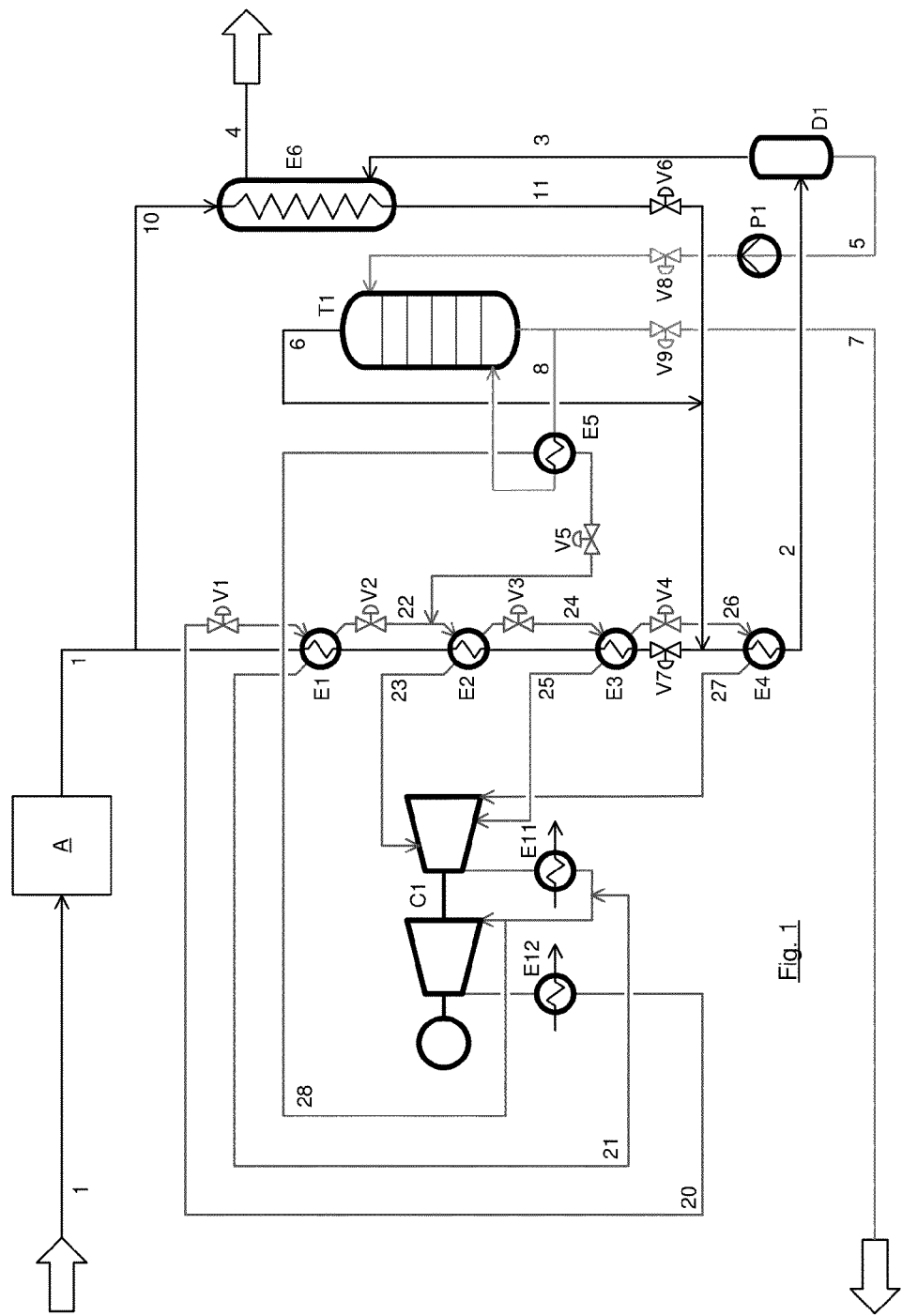
FIG. 1 shows an embodiment of the method according to the invention.

According to the invention, the rectification column T1 is operated at a pressure between 40 and 65 bar, preferably between 50 and 60 bar. This pressure is above the pressure of the hydrocarbon-rich fraction upstream of the heat exchanger E4. Should the pressure of the hydrocarbon-rich fraction at this point be too high, it is appropriately limited by means of the valve V7. At the top of the rectification column T1, a $CO_2$-depleted gas fraction 6 is taken off and likewise fed to the hydrocarbon-rich fraction between the heat exchangers E3 and E4.

From the sump of the rectification column T1, a $CO_2$-rich liquid fraction 7 is expanded to the desired delivery pressure in the expansion valve V9, and removed and fed to further use thereof. A substream 8 of this liquid fraction is at least partly vaporized in the reboiler E5 against a refrigerant substream 28, which will be considered in more detail hereinafter, and then fed to the rectification column T1 in the sump region. For heating the reboiler E5, according to the invention, henceforth it is not sensible heat that is used, such as, for example, in the case of US patent application 2013/0030765, but the heat of condensation of the refrigerant substream 28 that is used. This condensable substream has a pressure which is at 1 to 15 bar, preferably 3 to 10 bar, above the chosen operating pressure of the rectification column T1. As a result, a sufficiently high temperature difference is ensured in the reboiler E5.

The abovementioned refrigeration circuit, the refrigerant of which is technically pure $CO_2$, is compressed by means of the compressor unit C1 to the desired circuit pressure, which is generally at least 90 bar, preferably at least 100 bar. It is thereby markedly above the critical pressure of the carbon dioxide. The compressed refrigerant 20 is cooled in the aftercooler E12 against a suitable external medium and then expanded by the valve V1 into the first of the four heat exchangers, i.e., heat exchanger E1. The resultant gaseous refrigerant fraction is fed via conduit 21 to the compressor unit C1 at a suitable intermediate pressure stage, whereas the liquid fraction 22, produced in the expansion in valve V1 of the refrigerant, is expanded via the valve V2 into the second heat exchanger V2. In a similar manner, the liquid fractions 24 and 26 produced in the heat exchangers E2 and E3, respectively, are expanded by means of the valves V3 and V4, respectively, and the gaseous refrigerant fractions 23, 25 and 27 produced in the heat exchangers E2 to E4, respectively, are fed to the compressor unit C1 at suitable pressure stages.

As already mentioned above, according to the invention, a refrigerant substream is used for heating the reboiler E5 of the rectification column T1. In the exemplary embodiments shown in FIGS. 1 and 2, this is a substream of the intake stream of the last compressor stage of the compressor unit C1. This refrigerant substream, after passage through the reboiler E5, is expanded in the valve V5 and admixed to the refrigerant substream 22. Heating the reboiler E5 with a subcritical, condensable refrigerant substream—this assumes that the pressure is less than 73 bar—enables the methane concentration of the $CO_2$-rich liquid fraction taken off from the sump of the rectification column T1 to be restricted to values<1% by volume, preferably <0.1% by volume, since the heat transformation in the reboiler E5 is virtually unlimited.

On account of the use according to the invention of a refrigeration circuit which uses technically pure $CO_2$ as refrigerant, in the separator D1, the lowest operationally reliable temperature and therefore the lowest possible $CO_2$ concentration—this is 15 to 25% by volume, preferably 18 to 23% by volume—in the $CO_2$-depleted gas fraction 3 taken off at the top of the separator D1 can be achieved.

Advantageously, at least the four abovementioned heat exchangers E1 to E4 are constructed as double-pipe heat exchangers. The temperature profile thereof is more readily controllable in comparison with multistream exchangers, in such a manner that a safe operating mode is achievable.

Figure 2:
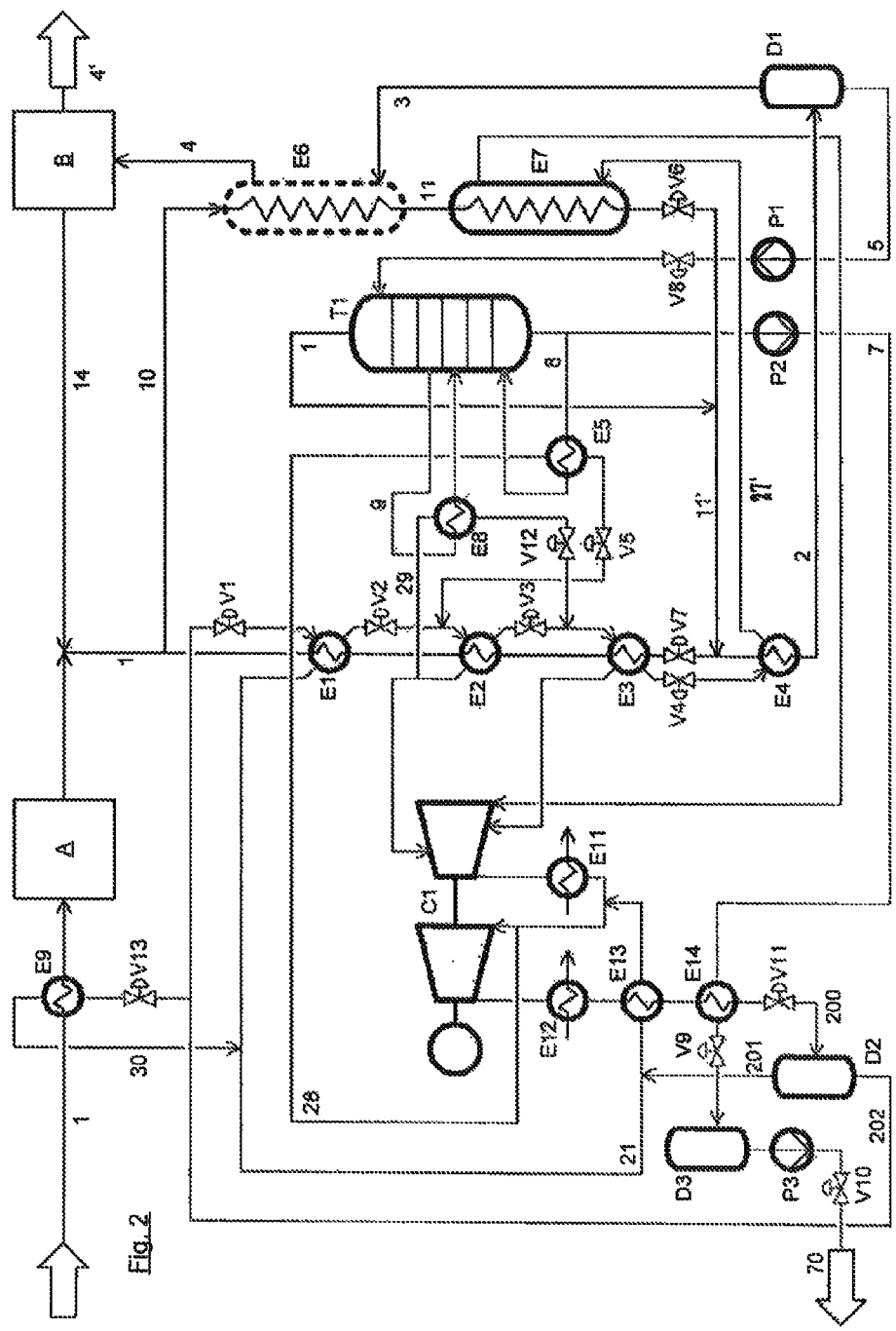
FIG. 2 shows a further embodiment of the method according to the invention.

Hereinafter, the exemplary embodiment shown in FIG. 2 will be described in more detail, but only the differences from the exemplary embodiment depicted in FIG. 1 will be considered.

The refrigerant 200 compressed in the compressor unit C1 is cooled in the aftercooler E12 against a suitable external medium and in the aftercoolers E13 and E14 against method streams which will be considered in more detail hereinafter, and then expanded via the valve V11 into the separator D2. The gaseous refrigerant fraction 201 taken off at the top of the separator D2 is admixed to the refrigerant substream 21 and serves together with this in the aftercooler E13 for cooling the compressed refrigerant 200. The liquid refrigerant fraction 202 taken off from the sump of the separator D2 is expanded via the valve V1 into the first heat exchanger E1.

The $CO_2$-rich liquid fraction 7 that is obtained by rectification serves for cooling the compressed refrigerant 200 in the aftercooler E14. To avoid an unwanted (partial) evaporation of this liquid fraction, the pressure thereof is elevated by means of the pump P2 above the boiling pressure downstream of the heat exchanger E14 used for the cooling.

After passage through the aftercooler E14, the $CO_2$-rich liquid fraction 7 is expanded in the valve V9 and fed to the separator D3. The valve V9 serves for level control in the sump of the rectification column T1. The $CO_2$-rich liquid fraction 70 taken off from the sump of the separator D3 serving as pump reservoir can then be pumped by means of the pump P3 to a high pressure (>150 bar, preferably >300 bar) and used for tertiary oil recovery (EOR). The valve V10 serves for level control in D3.

Furthermore, the rectification column (T1) has a side reboiler (E8) which is heated by means of a condensable refrigerant substream 29 of the refrigeration circuit that is at a suitable pressure level. The pressure thereof is at at least 8 bar, preferably at least 12 bar, below the pressure of the refrigerant substream (28) conducted through the reboiler E5. By means of this advantageous configuration, thermal integration is improved and the energy consumption of the compressor unit C1 is further reduced.

In order to reduce the risk of formation of $CO_2$ solids in the suction conduit between the heat exchanger E4 and the compressor unit C1, the refrigerant substream 27' taken off from the heat exchanger E4, before compression thereof C1, is warmed in the heat exchanger E7 against the substream 11 of the hydrocarbon-rich fraction 1. After expansion in valve V6, the abovementioned substream 11' is then fed to the hydrocarbon-rich fraction between the heat exchangers E3 and E4.

In a development of the method according to the invention for separating off acid gases from a hydrocarbon-rich fraction, it is proposed that the $CO_2$-depleted gas fraction 3 obtained in the partial condensation is fed to a further $CO_2$ separation process B. In this case this can be, in particular, a membrane process, an amine scrubbing and/or a methanol scrubbing. The after-purified $CO_2$-depleted fraction 4' is then fed to further use thereof. The return stream 14 produced in the $CO_2$ separation process B can optionally be fed to the hydrocarbon-rich fraction 1 before cooling thereof. If a methanol scrubber is provided as a further $CO_2$ separation process B, the heat exchanger E6 drawn in dashed lines can be dispensed with, and so the $CO_2$-depleted gas fraction 3 produced in the partial condensation is fed directly to the $CO_2$ separation process B, whereas, in all other cases, after passage through the heat exchanger E6, it is fed via conduit 4 to the $CO_2$ separation process B.

If the hydrocarbon-rich fraction 1, before cooling thereof, is subjected to a drying A, the hydrocarbon-rich fraction 1 is advantageously, before this drying, precooled against a refrigerant substream 30 of the refrigeration circuit in the heat exchanger E9, wherein this refrigerant substream 30 is expanded via the valve V13 into the heat exchanger E9.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application DE 102013011640.6, filed Jul. 11, 2013, are incorporated by reference herein.

The invention claimed is:

1. A method for separating off acid gases from a hydrocarbon-rich fraction, said method comprising:
    cooling and partially condensing (E1-E4) the hydrocarbon-rich fraction to a temperature close to the $CO_2$ triple point (−56.6° C.) in a multi-stage heat exchanger which uses a closed refrigeration circuit, wherein a refrigerant having a $CO_2$ fraction of greater than 99.5% by volume is circulated in said refrigeration circuit to obtain a partially condensed hydrocarbon-rich fraction, wherein, after each stage of the multi-stage heat exchanger, a gaseous refrigerant fraction is fed back to a compressor unit of said refrigeration cycle, and, after each stage of the multi-stage heat exchanger except for the last stage, a liquid refrigerant fraction is fed to the next stage of the multi-stage heat exchanger;
    separating the partially condensed hydrocarbon-rich fraction into a $CO_2$-reduced gas fraction and a $CO_2$-enriched liquid fraction;
    separating the $CO_2$-enriched liquid fraction by rectification in a rectification column having a reboiler into a $CO_2$-rich liquid fraction and a $CO_2$-depleted gas fraction,
        wherein said rectification column is operated at a pressure between 40 and 65 bar, and said reboiler of the rectification column is heated by a condensing refrigerant substream of the refrigeration circuit; wherein said multi-stage heat exchanger has four stages, said condensing refrigerant substream of the refrigeration circuit which is used to heat said reboiler of the rectification column is removed from the reboiler and combined with the liquid refrigerant fraction removed from the first stage of the multi-stage heat exchanger and then fed to the next stage of the multi-stage heat exchanger, said CO2-reduced gas fraction is warmed in a heat exchanger against a substream of said hydrocarbon-rich fraction, and said substream of said hydrocarbon-rich fraction is thereafter combined with the hydrocarbon-rich fraction at a point between the third and fourth stages of said multi-stage heat exchanger, and the CO2 depleted gas fraction from said rectification column is combined with the hydrocarbon-rich fraction at a point between the third and fourth stages of said multi-stage heat exchanger.

2. The method according to claim 1, wherein said acid gases are $CO_2$ and $H_2S$, and said hydrocarbon-rich fraction is natural gas.

3. The method according to claim 1, wherein said hydrocarbon-rich fraction is not cooled below a temperature of −55° C.

4. The method according to claim 3, wherein said hydrocarbon-rich fraction is not cooled below a temperature of −52° C.

5. The method according to claim 1, wherein the rectification column is operated at a pressure between 50 and 60 bar.

6. The method according to claim 1, wherein said hydrocarbon-rich fraction is cooled against the refrigeration circuit exclusively in double-pipe heat exchangers in said multi-stage heat exchanger.

7. The method according to claim 1, wherein said refrigerant substream used for heating the reboiler of the rectification column has a pressure which is between 1 and 15 bar above the operating pressure of the rectification column.

8. The method according to claim 7, wherein said refrigerant substream used for heating the reboiler of the rectification column (T1) has a pressure which is between 3 and 10 bar above the operating pressure of the rectification column.

9. The method according to claim 1, wherein said $CO_2$-rich liquid fraction obtained by rectification is used for cooling compressed refrigerant in a heat exchanger, wherein, to avoid partial or complete evaporation of said $CO_2$-rich liquid fraction, wherein the pressure of said $CO_2$-rich liquid fraction is elevated above the boiling pressure downstream of said heat exchanger used for cooling the compressed refrigerant.

10. The method according to claim 1, wherein there is at least one side reboiler of the rectification column, and this side reboiler is heated by a refrigerant substream of the refrigeration circuit that is at a suitable pressure level, wherein the pressure thereof is at at least 8 bar below the pressure of the refrigerant substream conducted through the reboiler.

11. The method according to claim 10, wherein said side reboiler is heated by a refrigerant substream of the refrigeration circuit that is at a pressure of at at least 12 bar below the pressure of the refrigerant substream (28) conducted through the reboiler (E5).

12. The method according to claim 1, wherein said hydrocarbon-rich fraction, before the cooling thereof, is subjected to a drying procedure wherein said hydrocarbon-rich fraction, before said drying procedure, is precooled against a refrigerant substream of the refrigeration circuit.

13. The method according to claim 1, wherein said refrigerant substream (27'), that is taken off from said multi-stage heat exchanger at the lowest temperature level, is warmed before compression thereof.

14. The method according to claim 1, wherein said $CO_2$-depleted gas fraction obtained in said partial condensation is fed to a further $CO_2$ separation process.

15. The method according to claim 14, wherein said further $CO_2$ separation process is a membrane process.

16. The method according to claim 14, wherein said further $CO_2$ separation process is an amine scrubbing.

17. The method according to claim 14, wherein said further $CO_2$ separation process is a methanol scrubbing.

18. The method according to claim 4, wherein said hydrocarbon-rich fraction is cooled in said multistage refrigeration circuit to a temperature of at least −45° C. but not below a temperature of −55° C.

19. The method according to claim 4, wherein said hydrocarbon-rich fraction is cooled in said multistage refrigeration circuit to a temperature of at least −45° C. but not below a temperature of −52° C.

20. A method for separating off acid gases comprising $CO_2$ from a hydrocarbon-rich fraction, said method comprising:

cooling and partially condensing (E1-E4) said hydrocarbon-rich fraction to a temperature of at least −45° C. but not below a temperature of −55° C. by a closed multistage refrigeration circuit in which a refrigerant is circulated, said refrigerant having a $CO_2$ fraction of greater than 99.5% by volume, wherein, after each stage of the multi-stage heat exchanger, a gaseous refrigerant fraction is fed back to a compressor unit of said refrigeration cycle, and, after each stage of the multi-stage heat exchanger except for the last stage, a liquid refrigerant fraction is fed to the next stage of the multi-stage heat exchanger;

separating (D1) the partially condensed hydrocarbon-rich fraction into a $CO_2$-depleted gas fraction (3) and a $CO_2$-enriched liquid fraction (5), separating the $CO_2$-enriched liquid fraction (5) in a rectification column into a further $CO_2$-depleted gas fraction (6) and a further $CO_2$-rich liquid fraction (7), wherein said rectification column is operated at a pressure between 40 and 65 bar, and heating a reboiler of said rectification column by a condensing refrigerant substream of the refrigeration circuit that is at a pressure which is between 1 and 15 bar above the operating pressure; wherein said multi-stage heat exchanger has four stages, said condensing refrigerant substream of the refrigeration circuit which is used to heat said reboiler of the rectification column is removed from the reboiler and combined with the liquid refrigerant fraction removed from the first stage of the multi-stage heat exchanger and then fed to the next stage of the multi-stage heat exchanger, said CO2-reduced gas fraction is warmed in a heat exchanger against a substream of said hydrocarbon-rich fraction, and said substream of said hydrocarbon-rich fraction is thereafter combined with the hydrocarbon-rich fraction at a point between the third and fourth stages of said multi-stage heat exchanger, and the CO2 depleted gas fraction from said rectification column is combined with the hydrocarbon-rich fraction at a point between the third and fourth stages of said multi-stage heat exchanger.

* * * * *